United States Patent [19]

Toth

[11] Patent Number: 5,421,788

[45] Date of Patent: Jun. 6, 1995

[54] PULLEY AND BEARING ASSEMBLY FOR INTERNAL COMBUSTION ENGINE FRONT END ACCESSORY DRIVE

[75] Inventor: Gerard S. Toth, Belleville, Mich.

[73] Assignee: Ford Motor Company, Dearborn, Mich.

[21] Appl. No.: 157,551

[22] Filed: Nov. 26, 1993

[51] Int. Cl.⁶ .................................................. F16H 7/12
[52] U.S. Cl. ..................................... 474/135; 474/199; 474/902
[58] Field of Search ................... 474/94, 133, 135, 139, 474/166, 199, 901, 902

[56] References Cited

U.S. PATENT DOCUMENTS

| | | |
|---|---|---|
| 1,232,391 | 7/1917 | Pierce . |
| 1,701,820 | 2/1929 | Morse . |
| 1,841,834 | 1/1932 | McRaven . |
| 2,039,875 | 5/1936 | Benson .................................. 384/546 |
| 2,611,148 | 9/1952 | Rappl . |
| 2,728,240 | 12/1955 | Stahlecker ............................. 474/199 |
| 2,979,368 | 4/1961 | Steichele ............................... 384/546 |
| 3,136,170 | 6/1964 | Murray . |
| 3,542,442 | 11/1970 | Kent ...................................... 384/473 |
| 3,707,092 | 12/1972 | Piech . |
| 3,975,965 | 8/1976 | Speer . |
| 4,031,761 | 6/1977 | Fisher et al. . |
| 4,047,445 | 9/1977 | Anderson ............................... 474/94 |
| 4,144,772 | 3/1979 | Brackin et al. . |
| 4,145,934 | 3/1979 | Sragal . |
| 4,285,676 | 8/1981 | Kraft ..................................... 474/135 |
| 4,351,636 | 9/1982 | Hager .................................... 474/135 |
| 4,392,840 | 7/1983 | Radocaj ................................. 474/117 |
| 4,551,120 | 11/1985 | Thomey ................................. 474/135 |
| 4,557,707 | 12/1985 | Thomey ............................... 474/135 X |
| 4,808,148 | 2/1989 | Holtz ..................................... 474/112 |
| 4,816,012 | 3/1989 | Bytzek ................................... 474/135 |
| 4,822,322 | 4/1989 | Martin ................................... 474/135 |
| 4,834,694 | 5/1989 | Martin ................................... 474/135 |
| 4,908,007 | 3/1990 | Henderson ............................ 474/135 |
| 4,917,655 | 4/1990 | Martin ................................... 474/112 |
| 4,934,988 | 6/1990 | Kawamura et al. .................. 474/117 |
| 4,989,398 | 2/1991 | Kuhn et al. ........................ 474/199 X |
| 5,045,029 | 9/1991 | Dec et al. .............................. 474/112 |
| 5,141,340 | 8/1992 | Van Tonder ...................... 384/473 X |
| 5,266,067 | 11/1993 | Gapco ................................... 474/112 |
| 5,304,100 | 4/1994 | Awasaka ............................... 474/135 |

FOREIGN PATENT DOCUMENTS

| | | |
|---|---|---|
| 2608277 | 9/1977 | Germany . |
| 3043287 | 6/1981 | Germany . |
| 279415 | 3/1952 | Switzerland . |

Primary Examiner—Roger J. Schoeppel
Attorney, Agent, or Firm—Jerome R. Drouillard; Roger L. May

[57] ABSTRACT

An idler pulley and bearing assembly for handling the drive belt of a front end accessory drive system of an internal combustion engine includes a bearing having an outer race and an inner race with an aperture for extending therethrough, and a mounting structure for securing the outer race of the bearing such that the outer race will not rotate. A pulley mounted upon a shaft extending through the aperture in the inner bearing is attached to the inner race such that the shaft pulley and inner race rotate at the same speed. This construction greatly reduces the rotational speed of the anti-friction elements within the bearing and preserves the bearing's lubrication, so as to prolong the life of the bearing, while reducing noise generated by the bearing.

1 Claim, 1 Drawing Sheet

PULLEY AND BEARING ASSEMBLY FOR INTERNAL COMBUSTION ENGINE FRONT END ACCESSORY DRIVE

BACKGROUND OF THE INVENTION

The present invention is related to a pulley and bearing system for guiding the front end accessory drive belt of an internal combustion engine.

DESCRIPTION OF THE PRIOR ART

Front end accessory drive systems for internal combustion engines typically use a flexible reinforced polymeric belt for driving a number of accessories such as an alternator, water pump, air-conditioning compressor, power steering pump, or other devices from the engine crankshaft. Operating a number of devices, particularly with a serpentine drive belt, requires that the belt be handled carefully to allow placement of the belt in the locations needed to drive the accessories without slippage. Precise location of the belt frequently calls for the use of idler pulleys. Prior art idler pulleys have, as shown in FIG. 3, typically used a pulley non-rotatably attached to outer race 74 of an anti-friction bearing such as a ball bearing. The inner race of the bearing, 72, has an aperture 76 through which bolt 78 passes to retain the outer race to tensioner arm 80 or perhaps to the front cover of the engine. With this configuration, inner race 72 remains stationary—i.e., it does not rotate. Conversely, outer race 74 rotates at the same speed as pulley 70. This often creates a problem because bearing balls 82 must have a rotational speed equal to the tangential speed of the inner portion of the outer race. As a result, a high ball-to-bearing race velocity occurs, causing accelerated wear in certain conditions. The high speed of the balls generates more heat and causes the grease in the bearing to degrade. Also, the spinning outer bearing race causes the lubricating oil to be separated from the grease filler which then allows the lubricating oil to be lost from the bearing. This causes a loss of lubrication and accelerates wear and heat build-up in the bearing.

A second drawback to the prior art idler pulley and bearing assembly resides in the fact that the clamp load imposed on inner race 72 by bolt 78 causes distortion of the inner race and results in greater heat generation and faster wear. Wear of the idler bearings is undesirable because long before the function of the bearing is lost, the bearing will become noisy and may very well generate complaints from motorists. Although fixed outer races have been used with automotive alternators, idler pulleys, including those mounted on tensioners, have used a fixed inner race.

A pulley and bearing assembly according to the present invention obviates the drawbacks of prior art idler pulley assemblies by maintaining the outer race of the bearing in a fixed, or stationary, position while fixing the pulley shaft to the inner race. In this manner, the rotational velocity of the ball bearings will be reduced by almost 50%, and the grease mixture of oil and filler will not be separated by centrifugal force, thus giving a synergistic improvement in bearing life. This invention will reduce bearing wear and operating noise. Another source of increased bearing life with the present invention resides in the fact that the fixed outer race will be able to conduct heat away from the bearing balls and lubricant, thereby avoiding lubricant degradation.

SUMMARY OF THE INVENTION

An idler pulley and bearing assembly for handling the drive belt of a front end accessory drive system of an internal combustion engine includes a bearing having an outer race and an inner race with an aperture extending therethrough, a mounting structure for securing the outer race of the bearing to the engine such that the outer race will not rotate, and a pulley mounted upon a shaft extending through the aperture, with the shaft being attached to the inner race such that the shaft, pulley, and inner race rotate at the same speed. A pulley and bearing assembly according to the present invention may be integral, such as a single stamping where the pulley has an integral shaft formed therewith, or alternatively may comprise a composite where the shaft and pulley are separate pieces jointed together. An idler pulley and bearing assembly according to the present invention may comprise a fixed idler pulley or may comprise a portion of a tensioner assembly, including a tensioner arm rotatably attached to the front of the engine and having a biasing means for urging the arm in one rotational direction, with the arm having a free end adapted to accept a tensioner pulley. The tensioner further includes a bearing having an outer race and an inner race with an aperture extending therethrough, the outer race being non-rotatably mounted within a bore formed in the free end of the tensioner arm, and a belt-contacting pulley mounted upon a shaft extending through the aperture, with the shaft being attached to the inner race of the bearing such that the shaft pulley and inner race rotate at the same speed, with the pulley being urged by the biasing means into contact with the drive belt. The biasing means may comprise a spring or other type of biasing device known to those skilled in the art and suggested by this disclosure.

DETAILED DESCRIPTION OF THE PREFERRED EMBODIMENTS

Figure 1:
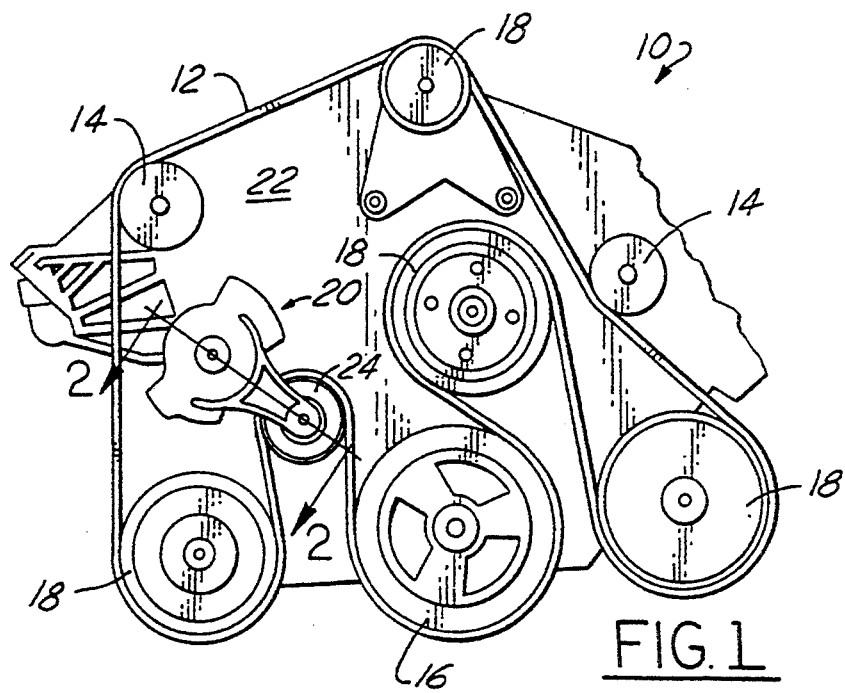
FIG. 1 is a schematic representation of an engine having a front end accessory drive idler pulley and bearing assembly according to the present invention.

As shown in FIG. 1, an engine 10 has flexible drive belt 12 trained over a variety of accessories 18. The accessories may comprise, for example, a power steering pump, an alternator, an air conditioning compressor, an air pump, or other devices known to those skilled in the art and suggested by this disclosure. Each of the devices is driven by drive belt 12 from crankshaft pulley 16. Tensioner 20 applies tension to drive belt 12 to prevent the belt from slipping. A plurality of idler pulleys 14 helps to handle drive belt 12 to allow the belt to service various accessories.

Figure 2:
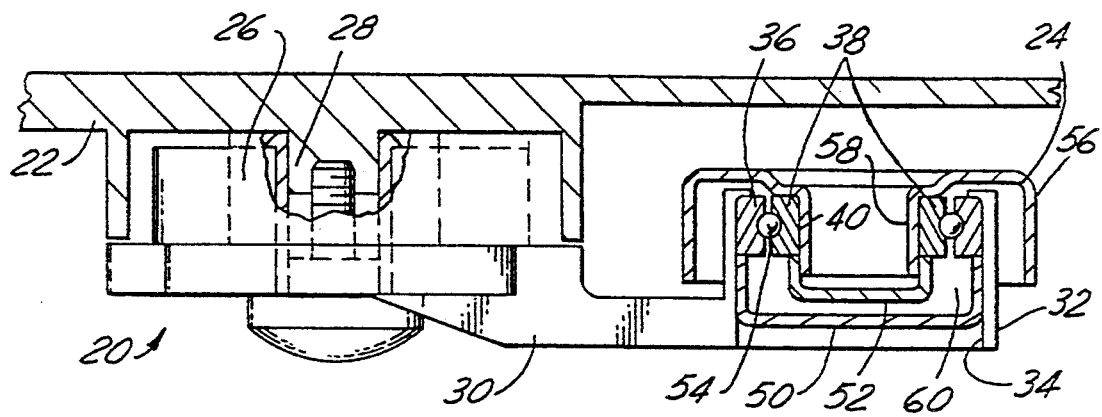
FIG. 2 is a sectional view of a tensioner assembly having a pulley and bearing assembly according to the present invention taken along the line 2—2 of FIG. 1.
Figure 3:
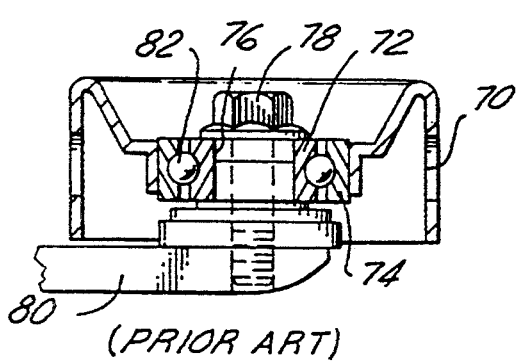
FIG. 3 is a prior art tensioner or idler pulley.

FIG. 2 illustrates a belt tensioner having a pulley and bearing assembly according to the present invention. Tensioner arm 30 is rotatably mounted to pivot post 28 carried upon front cover 22 of engine 10. The arm is urged by spring 26 in the counterclockwise direction as viewed in FIG. 1. In this manner, tensioner 20 applies tension to drive belt 12.

Details of a pulley and bearing assembly according to the present invention are shown in FIG. 2, as follows. Bore 34 contained in free end 32 of arm 30 receives outer race 36, which in this case is the outer race of a ball bearing having a plurality of balls, 54. Those skilled in the art will appreciate in view of this disclosure that a variety of anti-friction bearings such as ball, roller, or needle bearings, or other types known to those skilled in the art and suggested by this disclosure, could be used in a system according to the present invention. Outer race 36 is retained within generally circular bore 34 by means of a locking device applied to a wall portion of bore 34. In the case of the structure shown in FIG. 2, cup-shaped retainer 50 is pressed into bore 34 to retain outer race 36 within bore 34. The outer diameter of outer race 36 is a slip-fit within bore 34. In this manner, outer race 36 is not distorted, as would be the case were the outer race to be pressed into bore 34 with an interference fit. The bearing shown in FIG. 2 further comprises inner race 38, having pulley shaft 58 extending through aperture 40 formed in inner race 38. Rim 56 of pulley 24 may be integral with shaft 58 or could be part of a composite assembly. In any event, in the configuration of FIG. 2, shaft 58 is retained to the inner race by means of retainer cap 52, which is pressed in place upon the outer diameter of shaft 58. Because cup-shaped retainer 50 has an open end in contact with outer race 36, and because retainer cap 52 has a closed center, retainer 50 and cap 52 thereby form a generally annular-shaped lubricant reservoir which may be packed with grease or other suitable lubricant in an amount far exceeding currently available lubricant reservoirs for tensioner pulley bearings. In this manner, the life of a bearing assembly according to the present invention may be greatly extended.

Figure 4:
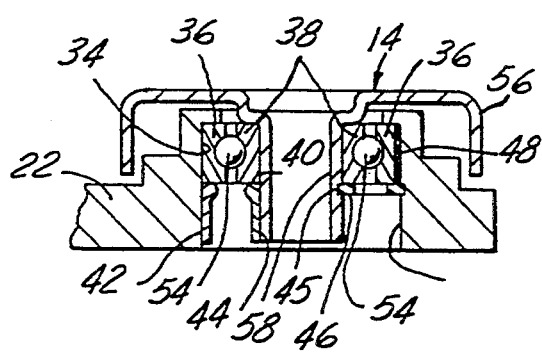
FIG. 4 is a further example of a tensioner or idler pulley according to the present invention.

FIG. 4 illustrates another embodiment according to the present invention in which an idler pulley is attached to front cover 22 of an engine. As before, outer race 36 is a slip-fit within bore 34 formed in its mounting structure, in this case, front cover 22. A difference here, however, resides in the fact that outer race 36 is retained by means of ring-shaped inside retainer 42, which is press-fit within bore 34. As before, the assembly of FIG. 4 includes pulley 14 having a rim 56 and a shaft 58. Shaft 58 is assembled through aperture 40 within inner race 38. As with the outer race, alternate locking devices are illustrated for retaining shaft 58 to inner race 38. Ring-shaped outside retainer 44 may be press-fit over shaft 58. Alternatively, snap ring 46 may be employed in a groove 45 formed in the outer diametral surface of shaft 58. As an alternative to ring-shaped inside retainer 42, the outer race 36 may be retained within bore 34 by means of an aerobic adhesive 48. Those skilled in the art will appreciate in view of this disclosure that other types of retention means may be used for the purpose of employing a pulley and bearing assembly according to the present invention. In both embodiments, distortion of inner race 38 is avoided because shaft 58 is not pressed into aperture 40 with an interference fit. Rather, shaft 58 is a slip fit within aperture 40.

Those skilled in the art will appreciate that changes and modifications may be made to the invention described herein, while nevertheless coming under the scope of the following claims.

I claim:

1. A front end accessory drive system for an internal combustion engine having a tensioner for applying tension to a drive belt, with said tensioner comprising:

a tensioner arm rotatably attached to the front of the engine and having a biasing means for urging the arm in one rotational direction, with said arm having a free end adapted to accept a tensioner pulley;

a bearing having an outer race and an inner race with an aperture extending therethrough, with said outer race being non-rotatably mounted within a bore formed in the free end of said tensioner arm by means of a cup-shaped retainer having an open end in contact with the outer race; and a belt-contacting pulley mounted upon a shaft extending through said aperture, with the shaft being attached to the inner race of the bearing such that the shaft, pulley and inner race rotate at an identical rotary speed, with said pulley being urged by said biasing means into contact with the drive belt with the shaft being retained to the inner race by means of a retainer cap applied to an outer diameter of said shaft, such that said cup-shaped retainer and said cap form a generally annular-shaped lubricant reservoir of variable volume.

* * * * *